Jan. 28, 1969  F. W. MARTIN ET AL  3,424,568
METHOD OF SEALING AND RESILIENT SEAL FOR ELEMENTS HAVING
DIFFERENT COEFFICIENTS OF EXPANSION
Filed Sept. 9, 1965

INVENTORS
William C. Smith
Francis W. Martin
BY

*Gerhard K. Adam*

ATTORNEY

United States Patent Office 3,424,568
Patented Jan. 28, 1969

3,424,568
METHOD OF SEALING AND RESILIENT SEAL FOR ELEMENTS HAVING DIFFERENT COEFFICIENTS OF EXPANSION
Francis W. Martin, Painted Post, and William C. Smith, Corning, N.Y., assignors to Corning Glass Works, Corning, N.Y., a corporation of New York
Filed Sept. 9, 1965, Ser. No. 486,074
U.S. Cl. 65—59   5 Claims
Int. Cl. C03c 27/02; B32b 17/06

ABSTRACT OF THE DISCLOSURE

Method of forming a resilient seal between a first glass element and a second glass or crystalline element having different coefficients of linear expansion comprising attaching a ductile metal foil to a surface of the first glass element at one portion of the foil and attaching the ductile metal foil at another portion to a surface of said second element, the foil being shaped such that a movable intermediate zone capable of withstanding stresses arising from thermally caused dimensional changes of said elements is formed between said portions.

---

This invention relates to a method of forming a seal between two different elements having incompatible coefficients of expansion. In one specific aspect, it relates to attaching a window capable of transmitting light rays having certain wave lengths onto a glass envelope which absorbs the same wave lengths.

A simple and widely used method of making glass-to-glass and glass-to-metal seals involves heating the sealing areas to soften the glass and then bringing the parts together to form a direct union. Generally, this method can only be used for material having closely matched expansion characteristics. In glass-to-glass seals, when the thermal expansion of one glass differs substantially from that of the second glass, a dangerously high stress normally arises. To avoid such stresses, mismatched seals may be formed using intermediate expansion glasses or using metals which by their ability to yield offers some relief to the stresses in the glass. The latter principle was taught by W. G. Houskeeper in United States Patent No. 1,293,441 which describes a method of uniting glass sections having different coefficients of expansion by simultaneously welding the glass sections to the opposite sides of an intermediate ductile metal disc. These discs were made primarily from copper; iron and brass were also recommended.

In producing certain electronic tubes, it is desirable to attach a glass or crystalline material having specific light wave transmitting properties onto another glass which absorbs the same light waves. This makes it possible to project the light rays in one direction to a measuring and recording device. Heretofore in measuring the infrared transmission of various materials the infrared rays were generated within a metal housing and passed through a mechanically attached sapphire window. While it would have been more desirable to use a tube made of glass, no practical method was known for attaching the sapphire glass having an expansion coefficient of $65 \times 10^{-7}/°$ C. onto a relatively high expansion soda lime glass having an expansion coefficient of $92 \times 10^{-7}/°$ C.

Quite surprisingly, we have devolped a process for sealing a sapphire window to a standard soda lime lamp glass envelope. This method has broad application for sealing two glasses in which the difference in coefficients of expansion is in the range of about 5 to $55 \times 10^7/°$ C. over the range of 0 to 300° C.

It is, therefore, an object of the present invention to form a seal between two glass elements having different and incompatible expansion coefficients.

It is another object of the present invention to provide an infrared emitter having an infrared ray transmitting window sealed to an infrared ray absorbing glass envelope.

In accordance with the present invention, we have discovered a method of forming a resilient seal between a first glass element and a second glass or crystalline element having different coefficients of linear expansion. The method involves attaching a ductile metal foil to the surface of the first element at one portion of the foil and attaching the ductile metal foil to a surface of the second element at another portion of the foil such that a movable intermediate zone is formed between the two elements capable of wtihstanding stresses arising from thermally caused dimensional changes of the elements relative to each other.

The invention is more clearly understood from the following description taken in conjunction with the accompanying drawing in which.

Figure 1:
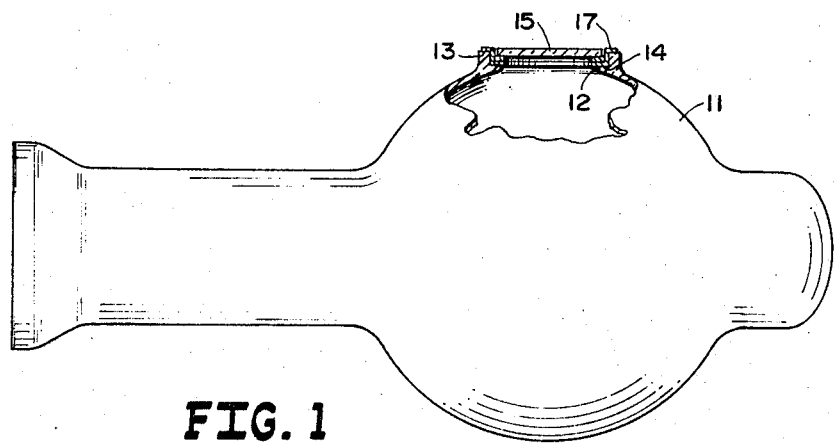
FIGURE 1 is a side elevational view of an electronic tube with a broken away section to show the novel seal.

In the embodiment illustrated by FIGURE 1, an envelope bulb 11 formed from a glass composition having relatively high coefficient of expansion, such as soda lime glass Code 0080, is designed with a circular opening 12 around which an outer ground glass seat 13 and an inner ground glass seat 14 are formed. In one embodiment of the invention, the glass envelope has poor infrared transmitting properties. A second glass or crystalline composition of lower thermal expansion in the shape of a circular disc 15 is ground to fit loosely in the recess between the outer seat 13 and the inner seat 14 and above the opening 12. The disc 15 may optionally be made out of sapphire element (synthetic crystalline alpha-alumina) which becomes a window capable of transmitting the particular wave length light desired, e.g. (Infrared ray light). between the outer seat 13 and the inner seat 14 and above the opening 12. The disc 15 may optionally be made out Between the disc 15 and the envelope bulb 11 is a ductile metal foil 17 which is sealed to both the envelope bulb 11 at the outer ground seat 13 and sealed to the bottom surface of the disc 15.

Figure 2:
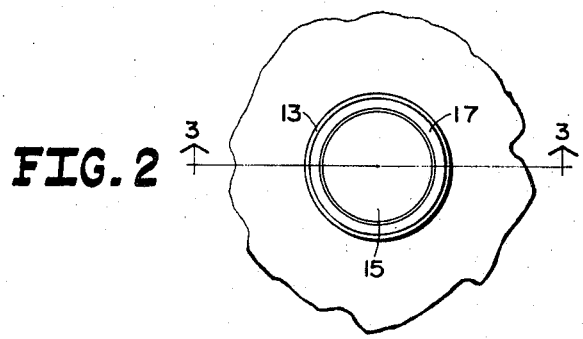
FIGURE 2 is a top plan view of the seal shown in the FIGURE 1.

Referring to FIGURE 2, the disc 15 is shown to be mounted on the inner ground seat 14 and with the intermediate metal foil 17 being located between and sealed to both the outer ground seat 13 and the disc 15.

Figure 3:
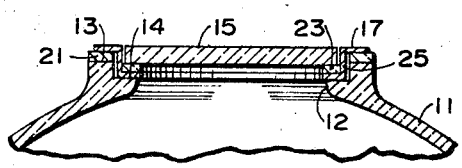
FIGURE 3 is an enlarged fragmental view of the elevation along line 3—3 of FIGURE 2.

FIGURE 3 shows an enlarged fragmental view of the novel seal of the present invention. The ductile metal foil 17 is shaped to fit the outer seat 13 and the inner seat 14 of the envelope 11. The disc 17 is attached at one surface at the underside of its outer peripheral rim with a first solder glass 21 to the outer seat 13. This first solder glass 21 should be compatible with the expansion characteristics of the glass envelope 11. At the inner depending portion of the foil 17, the glass disc 15 is attached by a second solder glass 23 which should be compatible with the glass disc 15. It is readily apparent from the drawing that an intermediate zone, a movable vertical riser 25, is formed between the two points of attachment. This zone is capable of withstanding some of the stresses arising from thermally caused dimensional changes of the elements relative to each other. The glass disc 15 is held in place in the finished electronic tube by a vacuum within the envelope bulb 11.

The seal between the high expansion envelope glass and the low expansion window is composed of three elements:
(1) A ductile metal foil;
(2) A solder glass attached to one portion of the foil and the envelope bulb; and
(3) A second solder glass attached at another portion of foil and the window disc.

This type of seal is able to relieve the stresses created resulting from the differences in thermal coefficients of the two glasses or glass and ceramic by means of the inherent ductile property of the metal itself and also, by the intermediate zone formed between the two glasses or glass and ceramic which is capable of absorbing stresses by some limited amount of movement.

The most useful ductile metal for forming the thin foil of the present invention is aluminum. This may readily be shaped to form a recessed washer having a preferred thickness of about 3 to 5 mils. Other useful ductile metals include platinum, silver, and copper. However, aluminum has some advantages over these since it has generally higher ductility than the other metals and it bonds to soft glasses without any special treatments. Copper, on the other hand, is ductile but does not form good bonds to low melting glasses at temperatures below about 620° C. Silver and platinum are less ductile than aluminum and considerably more expensive. A further consideration is that platinum has poor bonding properties tending to peel off from the glass. Sometimes it is desirable to use a combination of metals, for example, the advantages of the good bonding properties of silver and the high ductility of copper can be combined by using a silver plated copper foil.

The properties of the solder glasses should be tailored to the specific elements and ductile metal foil being bonded. As an illustration, in a preferred embodiment the glass envelope is a soda lime glass, the window is sapphire, and the foil is aluminum. The first solder glass between the aluminum metal foil and the soda lime glass should be compatible with both and have a relatively high thermal coefficient of expansion. Such a solder glass is commercially available from the Corning Glass Works under the designation Code 7570. This solder glass contains, in weight percent on the oxide basis, lead oxide 75%, boric oxide 11%, alumina 11%, and silica 3%. It has a softening point of 440° C. and an expansion of $84 \times 10^{-7}/°$ C. The second solder glass must be compatible with the ductile metal foil and the glass window disc. For the illustrated system, a particularly good solder glass has the following composition in weight percent on the oxide basis, lead oxide 68%; zinc oxide 5%; boric oxide 7.5%; silica 7.5%; and titanium dioxide 12.0%. It is preferred that the solder glasses be applied to the two glasses or elements being sealed simultaneously, although the solder glasses may be applied sequentially in two steps and at different temperatures by first attaching the foil to the sapphire window and then attaching the foil-window unit to the glass envelope. The maximum temperature that can be used for sealing is at least to some extent dependent upon the metal being used, thus, when the ductile metal foil is aluminum which has a melting point of 659.7° C. it is not possible to form the seal at higher temperatuses and preferrably it is desirable to use temperatures below 630° C.

In a preferred embodiment of the present invention, a ground glass seat is formed in a glass envelope made from soda lime glass. Fitted into the ground glass seat is a sapphire window of proper shape and dimensions which preferably is in the form of a disc. The aluminum foil is spun into a recessed washer shaped to fit between the glass envelope seat and the sapphire disc. Then the seal is formed by attaching the aluminum foil to the sapphire window using one type of solder glass and attaching the aluminum foil to the lamp envelope using a second type of solder glass as hereinabove described.

Obviously, many modifications and variations of the invention as hereinabove set forth may be made without departing from the spirit of the scope thereof and only such limitation should be applied as indicated in the claims.

We claim:
1. A method of forming a resilient seal between a first glass element and a second element having different coefficients of linear expansion comprising:
    attaching a ductile metal foil to a surface of said first glass element at one portion of said foil with a compatible sealing glass and
    attaching said ductile metal foil to a surface of said second element at another portion of said foil with a second compatible sealing glass
    said foil being shaped such that a movable riser capable of withstanding stresses arising from thermally caused dimensional changes of said elements is formed between said portions.

2. A method of forming a resilient seal between a soda lime glass envelope and a sapphire disc comprising:
    attaching an aluminum foil to a surface of the envelope at one portion of said foil with a compatible solder glass and
    attaching the foil to a surface of the disc at another portion of said foil with a second compatible solder glass
    said foil being shaped such that a movable riser capable of withstanding stresses arising from thermally caused dimensional changes of said elements is formed between said portions.

3. A resilient seal between a first glass element and a second element having different coefficients of linear expansion comprising a ductile metal foil attached at one portion to a surface of the first glass element with a compatible sealing glass and attached at another portion to a surface of a second element with a second compatible sealing glass said foil being shaped such that a movable riser is formed between said portions.

4. A resilient seal according to claim 3 wherein said metal foil is aluminum.

5. A resilient seal between a sapphire disc and an infrared absorbing soda lime glass body having a ground glass seat for receiving the disc, said seal comprising an aluminum foil having a thickness of 3–5 mils attached at one portion to a surface of the glass body with a compatible sealing glass and attached at another portion to a surface of the sapphire disc with a second compatible sealing glass, said foil being shaped such that a movable riser is formed between said portions.

References Cited

UNITED STATES PATENTS

| | | | |
|---|---|---|---|
| 2,876,596 | 3/1959 | Kessler | 65—59 |
| 1,293,441 | 2/1919 | Housekeeper | 65—59 X |
| 2,446,277 | 8/1948 | Gordon | 65—59 X |
| 3,113,878 | 12/1963 | Martin | 65—59 |
| 3,171,771 | 3/1965 | Badger et al. | 65—59 X |

DONALD H. SYLVESTER, *Primary Examiner.*

R. V. FISHER, *Assistant Examiner.*

65—36